No. 821,497. PATENTED MAY 22, 1906.
L. G. HUNTLEY.
FASTENING DEVICE FOR WAGON NUTS.
APPLICATION FILED MAY 23, 1905.

Witnesses
A. G. Hague

Inventor L. G. Huntley
by Orwig & Lane attys

UNITED STATES PATENT OFFICE.

LORING G. HUNTLEY, OF DES MOINES, IOWA.

FASTENING DEVICE FOR WAGON-NUTS.

No. 821,497.          Specification of Letters Patent.          Patented May 22, 1906.

Application filed May 23, 1905. Serial No. 261,793.

*To all whom it may concern:*

Be it known that I, LORING G. HUNTLEY, a citizen of the United States, residing at Des Moines, in the county of Polk and State of Iowa, have invented a certain new and useful Fastening Device for Wagon-Nuts, of which the following is a specification.

The objects of my invention are to provide a device for securing axle-nuts on the axles and to obviate entirely the danger of said nuts being removed by the action of the wheel upon the nut, and thus obviate entirely the danger of the wheels falling from the axles, as so often happens with the use of the ordinary nut.

A further object is to provide an auxiliary bolt or screw which is to be screwed into the axle and in engagement with which the retaining device is held by the spring in it to accomplish the desired result of maintaining the nut rigidly in position on the axle.

My invention consists in the construction, arrangement, and combination of the various parts of the device, whereby the objects contemplated are attained, as hereinafter more fully set forth, pointed out in my claim, and illustrated in the accompanying drawings, in which—

Figure 3:
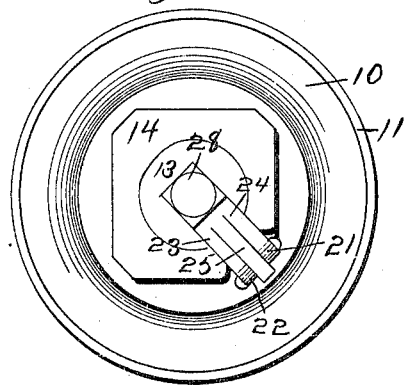
Figure 2:
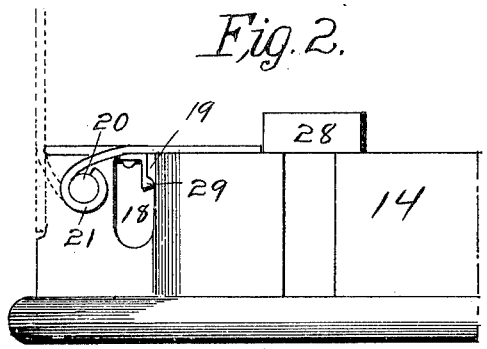
Figure 4:
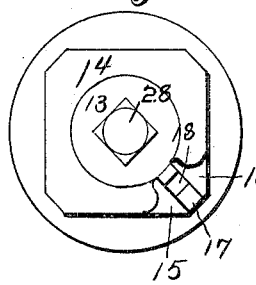
Figure 1:
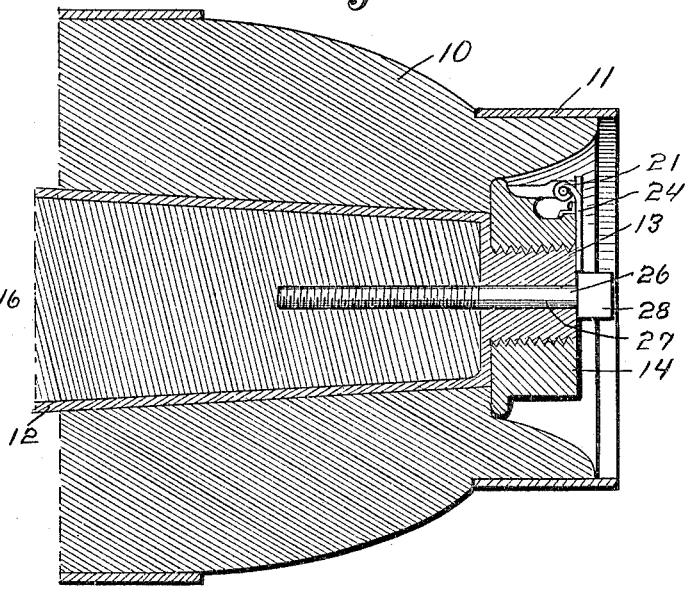

Figure 1 is a longitudinal sectional view of the outer end of the axle, showing my device upon it. Fig. 2 is a detail view of the nut, showing my fastening device connected with it. Fig. 3 is an end view of the hub in position on the axle, showing my fastening device connected with the nut; and Fig. 4 is an end view of the nut with the fastening device removed.

Referring to the accompanying drawings, I have used the reference-numeral 10 to indicate the hub of the wheel, the reference-numeral 11 to indicate the band at the end of it, the numeral 12 to indicate the axle having the ordinary screw-threaded outer end 13 thereon. I have provided the ordinary nut 14, except that I have cut away the portions 15 and 16 of it to admit the hinge portion of the retaining device and to provide the shoulder 17, for the purposes hereinafter made clear. In the inner portion of this shoulder and extending inwardly from the outer surface of the nut is a depression 18, having a lug 19 extending outwardly into this opening 18, as shown clearly in Fig. 2 of the drawings. Through the shoulder is an opening designed to receive the pivot 20. Encircling the outer ends of the pivot 20 are the hinge members 21 and 22 in such a way that they are capable of swinging on the pivot 20. These hinge members form the rear portions of the retaining device 23, which has a straight free edge 24 and which connects the outer ends of the hinge members 21 and 22. Attached to that portion of the retaining device which connects the free ends of the hinge members 21 and 22 and between said members I provide the spring 25, which extends over and stands normally in engagement with the shoulder 17 and is designed to normally maintain the retaining device either against the outer surface of the nut 14 or at right angles to said surface and against the side of said nut. From the outer end of the axle and extending into it is a screw-threaded opening 26, into which there is screwed a bolt 27, having the squared head 28, which head rests against the outer surface of the axle 12. The squared side of the head 28 is designed to be engaged by the straight edge 24 of the retaining device 23 when the nut has been screwed upon the axle for retaining said nut in position relative to the axle. Attached to the under surface of the spring 25 is a catch 29, designed to engage the lug 19, as shown in Fig. 2, which serves as an additional means for holding the retaining device in position relative to the outer surface of the nut.

In practical use and assuming that the nut has been screwed upon the axle and is held in position by the retaining device, as above described, and that it is desired to remove the nut from the axle, the operator places a wedge-shaped utensil under one edge of the retaining device 23 and forces it upwardly to a position at substantially right angles to the outer surface of the nut, and he then places the ordinary wagon-wrench upon the nut and removes it, the spring 25 serving to hold the retaining device in its open position at substantially right angles to the surface of the nut. When the nut is replaced, the one changing the nut upon the axle simply springs the retaining device against the surface of the nut, where it is maintained by the spring in the manner above described.

In bringing out this device it is my purpose to provide one of simple, durable, and inexpensive construction which can be readily attached to the ordinary nut and which will avoid the necessity of any additional wrenches for the purposes of removing the nut.

Having thus described my invention, what I claim, and desire to secure by Letters Patent of the United States therefor, is—

In a device of the class described, a bolt having a squared head secured to the axle, said squared head being outside of the end of the axle, a nut, a shoulder in the nut having a squared outer edge, a spring pivoted to the shoulder, designed to engage the squared edge of the shoulder and have its outer edge engage the squared head of the bolt for maintaining it in position against rotary movement, a lug inside of the nut, and a spring-catch secured to the spring for maintaining the spring securely in position.

LORING G. HUNTLEY.

Witnesses:
    S. F. CHRISTY,
    W. R. LANE.